(12) United States Patent
Krishnan et al.

(10) Patent No.: US 12,256,007 B2
(45) Date of Patent: Mar. 18, 2025

(54) DECENTRALIZED IDENTITY ACCESS MANAGEMENT USING BYZANTINE FAULT TOLERANT STATE MACHINE REPLICATION

(71) Applicant: VMware LLC, Palo Alto, CA (US)

(72) Inventors: Ram Krishnan, Cupertino, CA (US); Kostas Teofanidis, Sofia (BG); Vijaya Prakash Masilamani, Bangalore (IN); Michael William Achenbach, Los Altos, CA (US)

(73) Assignee: VMWare LLC, Palo Alto, CA (US)

( * ) Notice: Subject to any disclaimer, the term of this patent is extended or adjusted under 35 U.S.C. 154(b) by 233 days.

(21) Appl. No.: 18/104,329

(22) Filed: Feb. 1, 2023

(65) Prior Publication Data

US 2024/0187234 A1   Jun. 6, 2024

(30) Foreign Application Priority Data

Dec. 2, 2022   (IN) .............................. 202241069641

(51) Int. Cl.
| H04L 9/32 | (2006.01) |
| H04L 9/00 | (2022.01) |
| H04L 9/08 | (2006.01) |

(52) U.S. Cl.
CPC .......... H04L 9/3213 (2013.01); H04L 9/0819 (2013.01); H04L 9/50 (2022.05)

(58) Field of Classification Search
CPC ....... H04L 9/3213; H04L 9/0819; H04L 9/50; H04L 9/3239; H04L 9/3247
See application file for complete search history.

(56) References Cited

U.S. PATENT DOCUMENTS

| 2018/0337771 A1* | 11/2018 | Baker ................... H04L 9/3236 |
| 2020/0252211 A1* | 8/2020 | Chen ..................... H04L 9/0894 |

OTHER PUBLICATIONS

Ren, Ling, et al. "Practical synchronous byzantine consensus." arXiv preprint arXiv:1704.02397 (2017) (Year: 2017).*

* cited by examiner

*Primary Examiner* — Sangseok Park
(74) *Attorney, Agent, or Firm* — Quarles & Brady LLP

(57) ABSTRACT

A decentralized identity access management (IAM) architecture that executes IAM service code on the distributed nodes (i.e., replicas) of a Byzantine fault tolerant (BFT) state machine replication (SMR) system is provided. For example, the IAM service code may be implemented as a blockchain smart contract or as a native execution engine that runs on each replica. With this decentralized architecture, up to f replicas (where f is a threshold number defined by the system's BFT consensus protocol) can be faulty/corrupted without affecting the security of the system.

21 Claims, 4 Drawing Sheets

DECENTRALIZED IDENTITY ACCESS MANAGEMENT USING BYZANTINE FAULT TOLERANT STATE MACHINE REPLICATION

RELATED APPLICATIONS

Benefit is claimed under 35 U.S.C. 119(a)-(d) to Foreign Application Serial No. 202241069641 filed in India entitled "DECENTRALIZED IDENTITY ACCESS MANAGEMENT USING BYZANTINE FAULT TOLERANT STATE MACHINE REPLICATION", on Dec. 2, 2022, by VMware, Inc., which is herein incorporated in its entirety by reference for all purposes.

BACKGROUND

Unless specifically indicated herein, the approaches described in this section should not be construed as prior art to the claims of the present application and are not admitted to be prior art by inclusion in this section.

In computing, identity access management (IAM) is a framework for managing user identities and ensuring that the right users have appropriate access to the right resources (e.g., applications, data, etc.). Existing IAM solutions generally employ a centralized architecture comprising a central IAM server that is managed by a singular entity (e.g., a particular organization or a particular department within an organization). While this centralized approach is functional, it creates a single point of failure at the central IAM server and thus is highly vulnerable to attacks. For example, if the central IAM server is compromised, the security of the entire IAM solution may be broken.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to a decentralized IAM architecture that executes IAM service code on the distributed nodes (i.e., replicas) of a Byzantine fault tolerant (BFT) state machine replication (SMR) system. For example, the IAM service code may be implemented as a blockchain smart contract or as a native execution engine that runs on each replica. With this decentralized architecture, up to f replicas (where f is a threshold number defined by the system's BFT consensus protocol) can be faulty/corrupted without affecting the security of the system. Further, in embodiments where the IAM service code is implemented as a blockchain smart contract, that code can be easily extended and migrated to other environments that support the same (or a compatible) blockchain technology.

1. Centralized IAM Architecture

Figure 1:
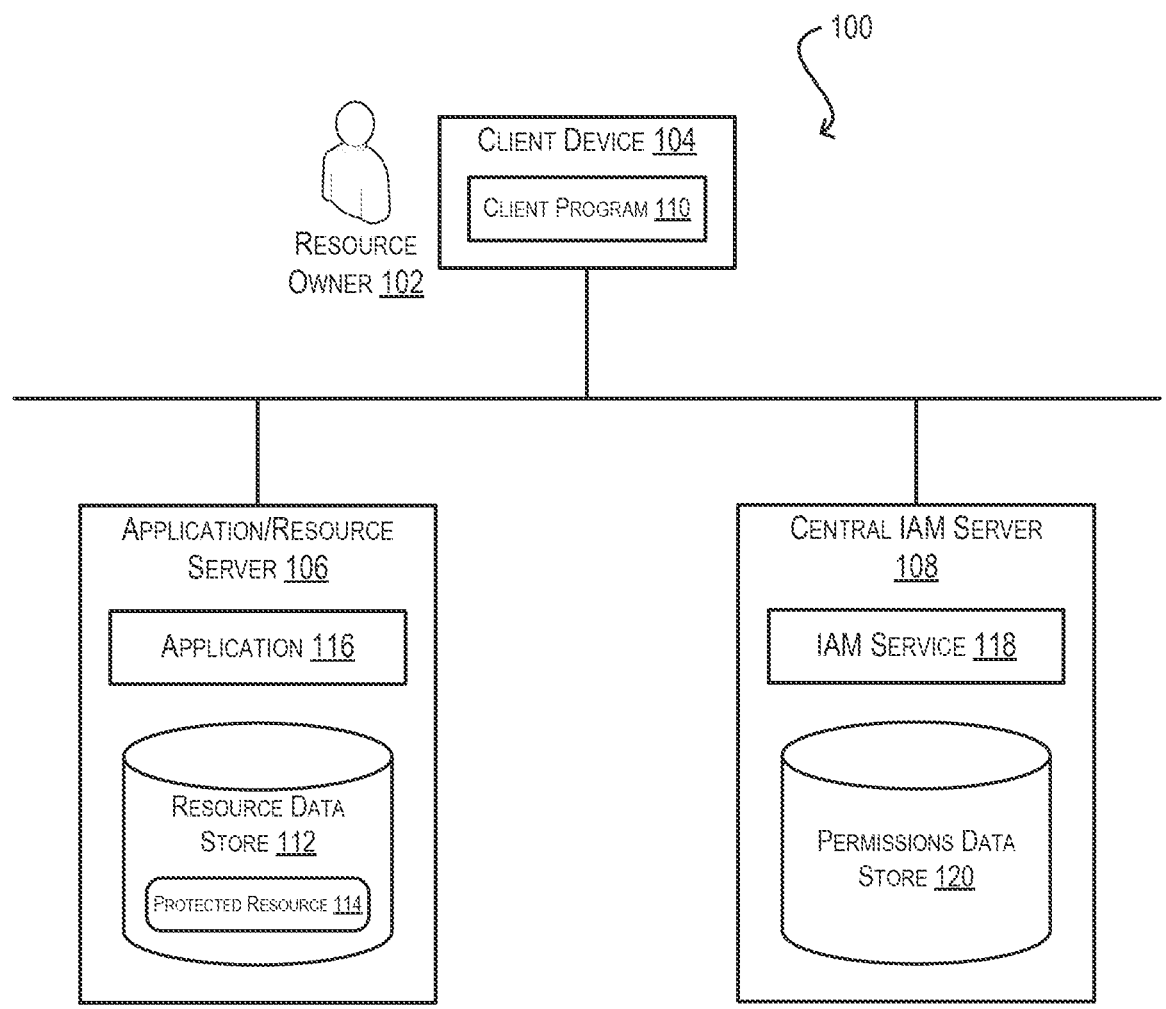
FIG. 1 depicts an example environment that employs a centralized IAM architecture.

To provide context for the embodiments of the present disclosure, FIG. 1 depicts an example environment 100 that employs a centralized IAM architecture for enabling user access to protected resources (i.e., resources that should be accessible only to authorized users). As shown, environment 100 includes a resource owner 102 operating a client device 104, an application/resource server 106, and a central IAM server 108.

Resource owner 102 is an entity that "owns" (or in other words, is authorized to access) protected resources such as music files, electronic documents, etc. Typically, resource owner 102 will be a human (e.g., an end-user of client device 104).

Client device 104 is a computing device/system that runs, among other things, a client program 110 usable by resource owner 102 to access one or more of their protected resources. In one set of embodiments, client program 110 may be a web application running in a web browser. In other embodiments, client program 110 may be a standalone application that runs natively on client device 104.

Application/resource server 106 is a server that maintains, in a resource data store 112, a protected resource 114 owned by resource owner 102 and runs an application 116 configured to provide this protected resource to the resource owner via client program 110. For example, in a scenario where protected resource 114 is a music file, application 116 may be a music streaming or download service. Although not shown, in some embodiments application/resource server 106 may be split into two separate servers: an application service dedicated to running application 116 and a resource server dedicated to hosting resource data store 112.

Central IAM server 108 is a server that runs an IAM service 118 configured to authenticate resource owner 102 and generate authorization information, referred to herein as an access token, indicating that the resource owner is entitled to access their protected resources. The generation of this access token is performed based a set of permissions associated with resource owner 102 that are maintained in a permissions data store 120.

According to a typical workflow within environment 100, resource owner 102 can submit (via, e.g., a web browser of client device 104) an authentication request to IAM service 118 of central IAM server 108 for obtaining an access token usable for accessing protected resource 114. This authentication request (also known as a session request or login request) includes security credentials/metadata associated with resource owner 102. For example, the authentication request may include a username and password of resource owner 102 or may be signed using the resource owner's private key.

In response, IAM service 118 can attempt to authenticate resource owner 102 based on the security credentials/metadata included in the authentication request. Assuming this authentication is successful (i.e., the provided security credentials/metadata are correct), IAM service 118 can create an access token containing permissions (also known as claims) regarding the resources accessible by resource owner 102 in accordance with permissions data store 120, sign the access token using a private key of the service, and return the signed access token to client device 104.

After receiving the signed access token, resource owner 102 can submit, via client program 110, a request to application 116 for accessing protected resource 114 that includes the token. In response, application 116 can validate that (1) the signed access token is authentic using a public key of IAM service 118, and (2) resource owner 102 is authorized to access protected resource 114 in accordance with the claims contained in the access token. Finally, upon successfully validating both (1) and (2), application 116 can grant resource owner 102/client program 110 access to protected resource 114.

As mentioned in the Background section, while the centralized IAM architecture shown in FIG. 1 is functional, it also suffers from a couple of drawbacks/limitations. First, because IAM service 118 and permissions data store 120 reside on a central server that is typically owned and maintained by a single entity (e.g., a particular organization), if that single server or entity is compromised by an adversary, the security of the entire system will be broken. For example, the adversary may allow unauthorized users to gain access to protected resources that they do not own, and/or prevent authorized users from accessing the protected resources they do own. In other words, the security of this architecture is susceptible to a single point of failure at central IAM server 108.

Second, because there are no standards in place regarding the implementation of IAM service 118 (and thus each instance of the service will be different in different deployments/environments), it is difficult to extend this service in a generic way to support new applications and to migrate the logic of the service from one deployment/environment to another.

2. Solution Architecture

Figure 2:
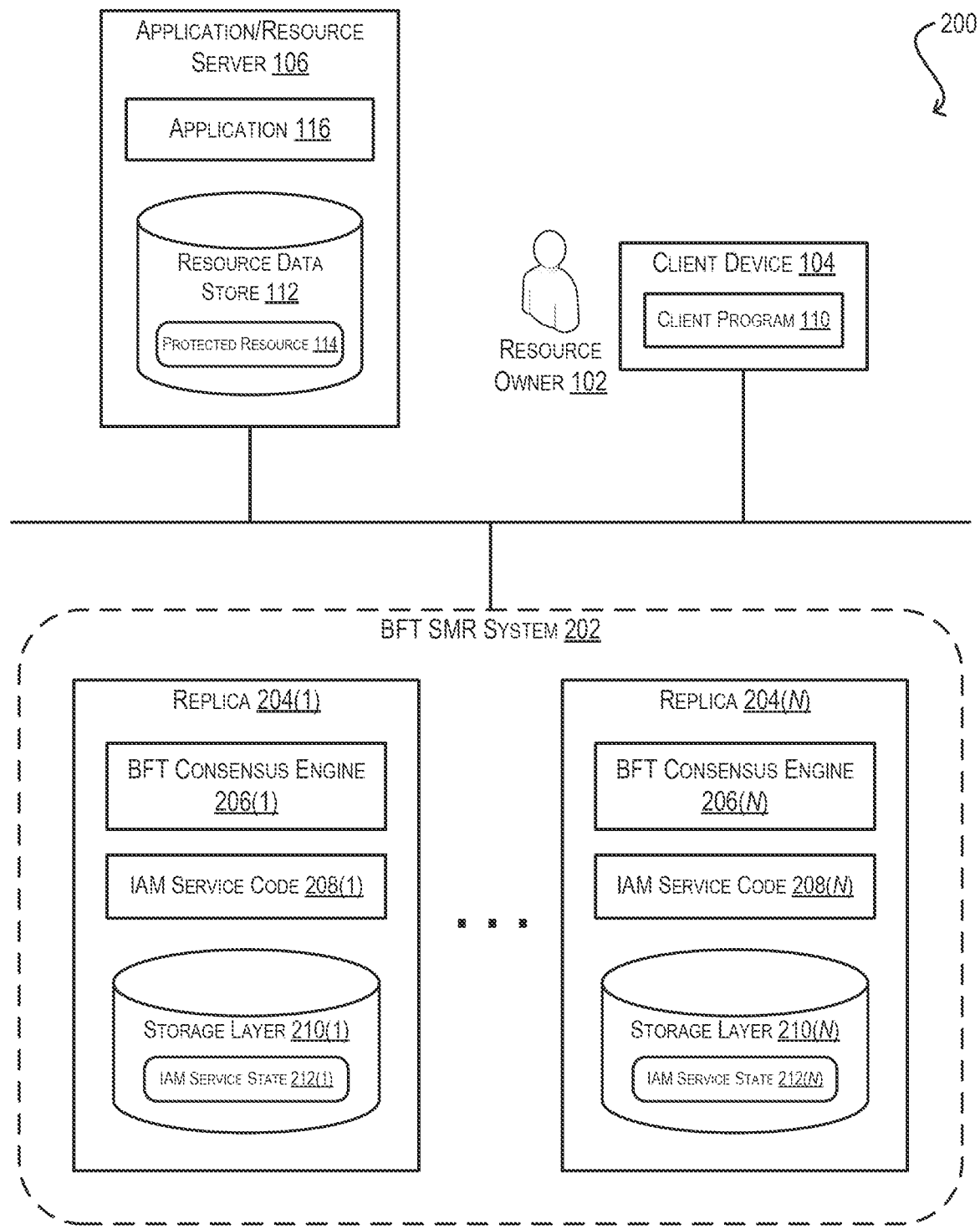
FIG. 2 depicts an environment implementing a decentralized IAM architecture according to certain embodiments.

To address the foregoing and other related problems, FIG. 2 depicts an environment 200 that implements a novel decentralized IAM architecture according to certain embodiments. Environment 200 is similar to environment 100 of FIG. 1 in that it includes a resource owner 102 operating a client device 104 and an application/resource server 106 comprising an application 116 and resource data store 112. However, in place of central IAM server 108, environment 200 includes a BFT SMR system 202 comprising a distributed set of server instances, referred to as replicas, 204(1)-(N). As known in the art, SMR is an approach for building fault-tolerant software services via such replicas that involves coordinating interactions between the replicas and service clients using a consensus layer to ensure all non-faulty replicas execute client requests in the same order (and thus maintain the same service state). This allows a subset of the replicas to fail without affecting service availability for the clients. BFT SMR is a type of SMR that can tolerate a threshold number of Byzantine replicas, which are faulty replicas capable of displaying arbitrary behavior. For example, the Byzantine replicas may collude and follow a strategy dictated by a malicious adversary. This threshold number is denoted as f, such that at most f out of the N replicas may be faulty.

In the case of BFT SMR system 202 of FIG. 2, replicas 204(1)-(N) are configured to provide a IAM service that is functionally similar to IAM service 118 of central IAM server 108, but in a decentralized manner. To that end, each replica 204 includes a BFT consensus engine 206 (which collectively make up the consensus layer of BFT SMR system 202), IAM service code 208, and a storage layer 210 comprising IAM service state 212. In one set of embodiments, storage layer 210 may be a blockchain and IAM service code 208 may take the form of a smart contract, such as an Ethereum smart contract, that is maintained on the blockchain. In other embodiments, IAM service code 208 may take the form of an execution engine that runs natively (i.e., as binary code) on each replica. IAM service state 212 can include, e.g., permissions associated with resource owner 102 like permissions data store 120 of FIG. 1, as well as other information needed by IAM service code 208.

As detailed in the sections that follow, at the time resource owner 102 wishes to obtain an access token for accessing protected resource 114 via application 116, the resource owner can submit, using client device 104, an authentication request to replicas 204(1)-(N) of BFT SMR system 202 that includes the resource owner's security credentials/metadata. The format of this authentication request can be substantially similar (or in some cases, identical) to the authentication request accepted by IAM service 118 of central IAM server 108. Because the replicas may not receive the authentication request in the same order relative to other requests sent by client device 104 and/or other clients, each replica 204 can pass the request to its BFT consensus engine 206 and the consensus engines can communicate with each other using a BFT consensus protocol to reach an agreement on an execution sequence number for the request. This guarantees that all non-faulty replicas (or in other words, at least N−f replicas) will process the request and will do so in the same order.

Upon reaching a consensus on the execution sequence number, IAM service code 208 of each replica 204 can independently process the authentication request by (1) authenticating resource owner 102 based on the security credentials/metadata included in the request, (2) generating an access token containing claims regarding the resources accessible by resource owner 102 (in accordance with the permissions held in IAM service state 212), and (3) signing the access token using a portion (i.e., share) of a private key sk that is uniquely assigned to, and only known by, that specific replica. These per-replica shares of private key sk are denoted herein as $sk_1, \ldots, sk_N$ and are generated via a (t, N) threshold signature scheme where t=f. Once at least f+1 replicas have signed the access token using their respective shares of private key sk, those signatures can be combined (by, e.g., a client service of BFT SMR system 202 or some other system component) into an aggregate signature in accordance with the (t, N) threshold signature scheme and this aggregate signature can be returned with the access token (in the form of an aggregate token) to client device 104.

At a later time, when resource owner 102 wishes to access their protected resource 114, the resource owner can provide, via client program 110, the aggregate token to application 116 as part of a resource access request. In response, application 116 can determine whether the resource access request should be granted by (1) verifying whether the aggregate signature in the aggregate token is valid using a public key pk that is the public key counterpart of private key sk, and (2) verifying whether the claims included in the token indicate that resource owner 102 is authorized to access protected resource 114. In certain embodiments, application 116 can retrieve public key pk directly from replicas 204(1)-(N) if the application does not have pk (or if the version of pk it holds is stale due to a key rotation by the replicas). Finally, assuming verification operations (1) and (2) are successful, application 116 can grant resource owner 102/client program 110 access to protected resource 114.

With the decentralized IAM architecture shown in FIG. 2 and summarized above, a number of advantages are realized. First, due to the properties of the BFT consensus protocol employed by replicas 204(1)-(N) and the (t, N) threshold signature scheme used to generate the aggregate token, this architecture ensures that the token generation process will be completed successfully and securely, even with up to f faulty replicas. This is because each individual replica 204 does not know and cannot learn private key sk itself; each replica only has knowledge of its own share of sk. Further, a valid aggregate signature cannot be created by less than f+1 replicas, which means that it is impossible for the faulty replicas of the system to forge an aggregate signature. Accordingly, the decentralized IAM architecture of FIG. 2 is substantially more robust and secure than the centralized approach shown in FIG. 1.

In certain embodiments, each replica of BFT SMR system 202 may be owned and managed by a different entity, such as a different organization in an industry consortium or a different operating unit in an enterprise. This further bolsters the security of the architecture by reducing the likelihood that multiple replicas will be rendered faulty/compromised at the same time.

Second, in the case where IAM service code 208 on each replica 204 is implemented using a standards-based blockchain smart contract, the service code can be easily extended in a generic fashion to support new applications, features, application programming interfaces (APIs), etc. and easily migrated/ported between different environments which support that type of smart contract. For example, consider a scenario where an enterprise maintains a permissioned blockchain system that implements the IAM techniques of the present disclosure via an Ethereum smart contract. In this scenario, the IAM service code and state maintained in that permissioned blockchain system can be easily migrated to a permissioned blockchain system of another organization or to a public blockchain that also supports Ethereum smart contracts.

It should be appreciated that FIG. 2 is illustrative and not intended to limit embodiments of the present disclosure. For example, although this figure depicts a particular arrangement of entities, other arrangements are possible (e.g., the functionality attributed to a particular entity may be split into multiple entities, entities may be combined, etc.). One of ordinary skill in the art will recognize other variations, modifications, and alternatives.

3. Token Generation

Figure 3:
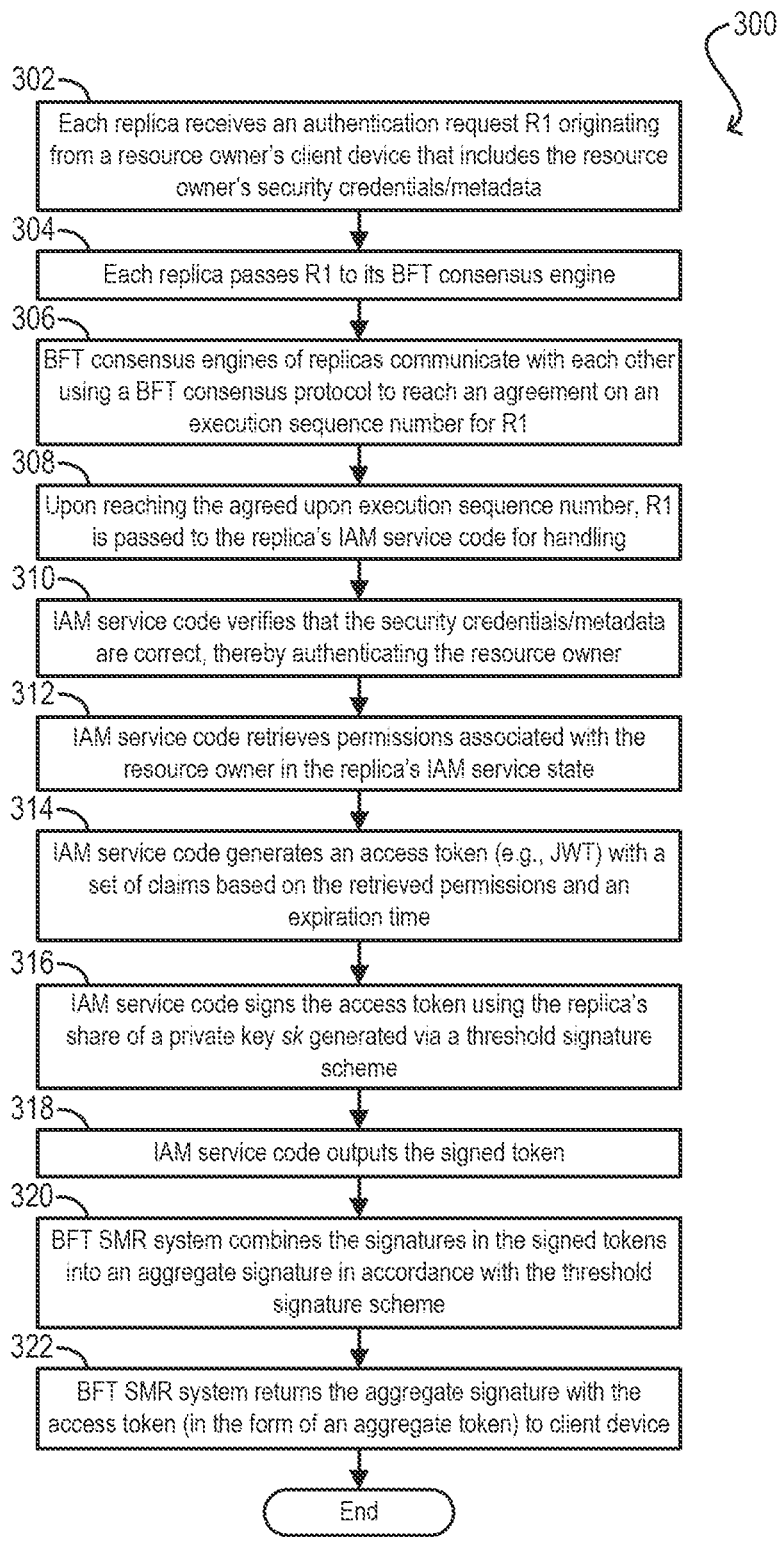
FIG. 3 depicts a token generation workflow using the decentralized IAM architecture of FIG. 2 according to certain embodiments.

FIG. 3 depicts a workflow 300 that provides additional details regarding the processing that may be performed by BFT SMR system 202 of FIG. 2 for generating an aggregate token in response to an authentication request from resource owner 102 according to certain embodiments. Workflow 300 assumes that each replica 204(i) of BFT SMR system 202 holds a secret share $sk_i$ of a private key sk that is created via a (t, N) threshold signature scheme where t equals f (i.e., the maximum number of faulty replicas in system 202).

Starting with step 302, each replica 204(i) can receive, from resource owner 102 via client device 104, an authentication request R1 that includes security credentials/metadata identifying the resource owner. For example, R1 may include a username and password of the resource owner or may be signed using the resource owner's private key.

At steps 304 and 306, each replica 204(i) can pass R1 to its BFT consensus engine 206 and the consensus engines can agree upon an execution sequence number for the request. Once this execution sequence number is reached, the authentication request can be passed to the replica's IAM service code 208 for handling (step 308).

At step 310, IAM service code 208 can verify that the security credentials/metadata included in R1 correctly corresponds to resource owner 102, thereby authenticating the identity of the resource owner. For example, if the security credentials/metadata comprises a username/password pair, IAM service code 208 can validate the username/password pair against a stored username/password pair maintained in IAM service state 212. Alternatively, if R1 is signed using a private key of resource owner 102, IAM service code 208 can validate the signature using a corresponding public key associated with the resource owner.

Upon authenticating the identity of resource owner 102, IAM service code 208 can retrieve permissions associated with the resource owner in IAM service state 212 (step 312), generate an access token with a set of claims based on the retrieved permissions (step 314), sign the access token using the replica's share $sk_i$ of private key sk (step 316), and output the signed access token (step 318). In a particular embodiment, the access token can take the form of a JSON Web Token (i.e., JWT). In some embodiments, the access token generated at step 314 may also include an expiration time indicating a future time at which the token will expire and thus no longer be valid for authorization purposes. In these embodiments, the expiration time may be agreed upon by the replicas via the BFT consensus protocol, rather than being decided by an individual replica.

Finally, at steps 320 and 322, some component of BFT SMR system 202 (e.g., a BFT client service) can receive the access tokens signed by the replicas using their respective shares of sk, combine the various signatures included in the signed tokens into a single aggregate signature in accordance with the (t, N) threshold signature scheme, and return the aggregate signature with the access token (as an "aggregate token") to client device 104.

4. Token Validation

Figure 4:
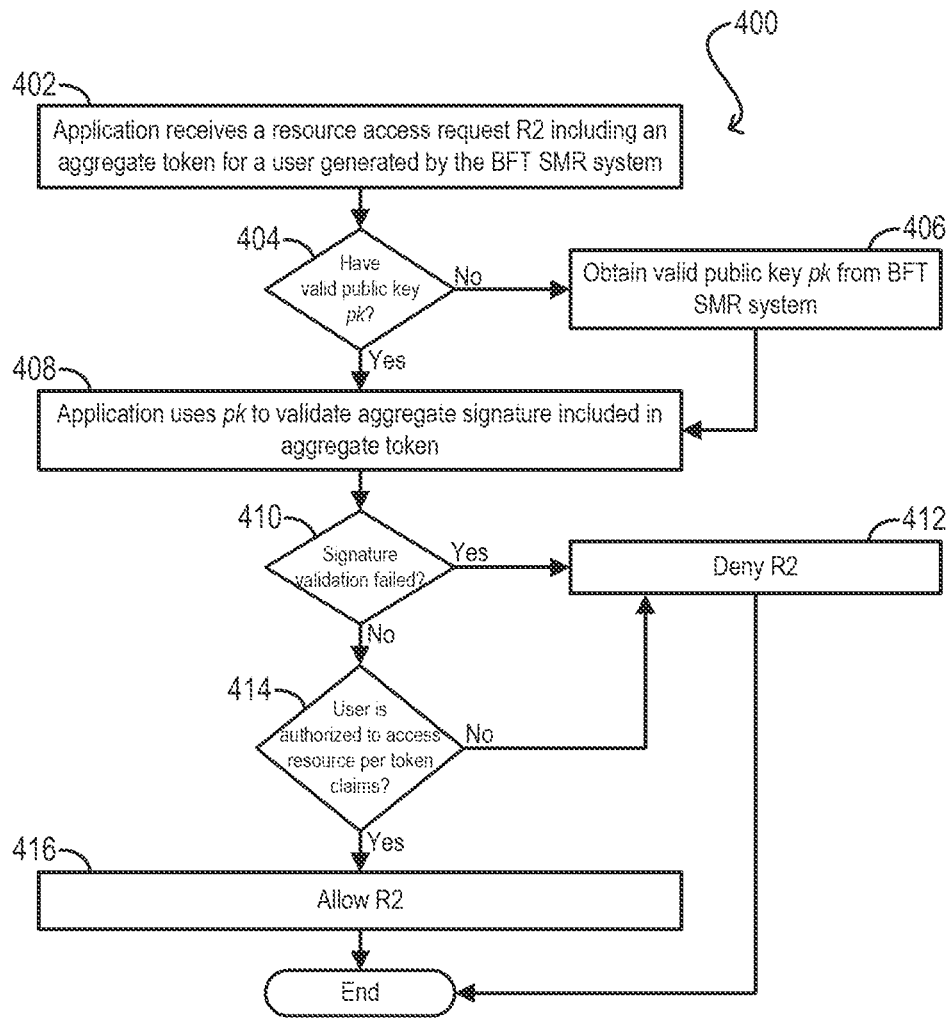
FIG. 4 depicts a token validation workflow using the decentralized IAM architecture of FIG. 2 according to certain embodiments.

FIG. 4 depicts a workflow 400 that provides additional details regarding the processing that may be performed by, e.g., application 116 of application/resource server 106 for validating an aggregate token in response to a resource access request according to certain embodiments.

Starting with step 402, application 116 can receive a request R2 to access protected resource 114 that includes an aggregate token associated with a user (e.g., the aggregate token generated for resource owner 102 via workflow 300 of FIG. 3). For example, R2 may be received from client program 110 of resource owner 102's client device 104.

At step 404, application 116 can check whether it currently holds a valid public key pk associated with the signer of the token (i.e., BFT SMR system 202). This public key pk is the public key counterpart of private key sk described with respect to workflow 300. If the answer is no, application 116 can retrieve the latest version of pk from BFT SMR system 202 by invoking an appropriate API implemented by replicas 204(1)-(N) via their IAM service code components 208(1)-(N) (e.g., a getPublicKey( ) API) (step 406).

At step 408, application 116 can use pk to validate the aggregate signature included in the aggregate token. If this signature validation fails (step 410), application 116 can deny the request (step 412) and the workflow can end. If the signature validation succeeds, application 116 can proceed to verify whether the claims included in the aggregate token indicate that the user is authorized to access protected resource 114 (step 414).

If the answer at 414 is no, application 116 can deny the request per previous step 412. However, if the answer at 414 is yes, application 116 can allow the request (step 416) and the workflow can end. Although not shown in workflow 400, in embodiments where the aggregate token includes an expiration time as mentioned previously, application 116 can also implement an additional check (for example, prior to validating the aggregate signature) in order to verify that the token has not expired. If the token has expired, application 116 can directly deny the request in accordance with step 412.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by each replica in a set of N replicas that compose a Byzantine fault tolerant (BFT) state machine replication (SMR) system, a request for authenticating a user, the request including security credentials for the user;
   in response to receiving the request, communicating, by each replica with other replicas in the set of N replicas, using a BFT consensus protocol to agree upon an execution sequence number for the request; and
   upon reaching the execution sequence number:
   verifying, by each replica, that the security credentials for the user are correct;
   retrieving, by each replica, resource access permissions associated with the user from a local storage layer of the replica;
   generating, by each replica, an access token with a set of claims based on the resource access permissions; and
   signing, by each replica, the access token using a share of a private key of the BFT SMR system that is assigned to the replica, the share being known only to the replica and being unknown to the other replicas in the set of N replicas.

2. The method of claim 1 wherein the verifying, retrieving, generating, and signing are executed by a blockchain smart contract running on each replica.

3. The method of claim 1 wherein the verifying, retrieving, generating, and signing are executed by an execution engine running on each replica.

4. The method of claim 1 wherein the BFT SMR system tolerates up to f faulty replicas, and wherein the shares of the private key assigned to the set of N replicas are generated using a (t, N) threshold signature scheme where t=f.

5. The method of claim 1 wherein each replica in the set of N replicas is owned by a different organization or a different department within an organization.

6. The method of claim 1 wherein the signed access tokens are combined into an aggregate token comprising an aggregate signature that is returned to the user.

7. The method of claim 6 wherein after receiving the aggregate token, the user submits a resource access request that includes the aggregate token to an application server, and wherein the application server:
   retrieves, from the BFT SMR system, a public key corresponding to the private key;
   validates the aggregate signature in the aggregate token using the public key; and
   validates that the user is authorized to access a resource identified in the resource access request based on a set of claims in the aggregate token.

8. A non-transitory computer readable storage medium having stored thereon program code executable by a replica in a set of N replicas that compose a Byzantine fault tolerant (BFT) state machine replication (SMR) system, the method comprising:

receiving a request for authenticating a user that includes security credentials for the user;

in response to receiving the request, communicating with other replicas in the set of N replicas using a BFT consensus protocol to agree upon an execution sequence number for the request; and upon reaching the execution sequence number:
verifying that the security credentials for the user are correct;
retrieving resource access permissions associated with the user from a local storage layer of the replica;
generating an access token with a set of claims based on the resource access permissions; and
signing the access token using a share of a private key of the BFT SMR system that is assigned to the replica, the share being known only to the replica and being unknown to the other replicas in the set of N replicas.

9. The non-transitory computer readable storage medium of claim 8 wherein the verifying, retrieving, generating, and signing are executed by a blockchain smart contract running on the replica.

10. The non-transitory computer readable storage medium of claim 8 wherein the verifying, retrieving, generating, and signing are executed by an execution engine running on the replica.

11. The non-transitory computer readable storage medium of claim 8 wherein the BFT SMR system tolerates up to f faulty replicas, and wherein the shares of the private key assigned to the set of N replicas are generated using a (t, N) threshold signature scheme where t=f.

12. The non-transitory computer readable storage medium of claim 8 wherein each replica in the set of N replicas is owned by a different organization or a different department within an organization.

13. The non-transitory computer readable storage medium of claim 8 wherein the signed access tokens are combined into an aggregate token comprising an aggregate signature that is returned to the user.

14. The non-transitory computer readable storage medium of claim 13 wherein after receiving the aggregate token, the user submits a resource access request that includes the aggregate token to an application server, and wherein the application server:
retrieves, from the BFT SMR system, a public key corresponding to the private key;
validates the aggregate signature in the aggregate token using the public key; and
validates that the user is authorized to access a resource identified in the resource access request based on a set of claims in the aggregate token.

15. A computer system acting as a replica in a set of N replicas that compose a Byzantine fault tolerant (BFT) state machine replication (SMR) system, the computer system comprising:
a processor;
a storage layer; and
a non-transitory computer readable medium having stored thereon program code that, when executed, causes the processor to:
receive a request for authenticating a user that includes security credentials for the user;
in response to receiving the request, communicate with other replicas in the set of N replicas using a BFT consensus protocol to agree upon an execution sequence number for the request; and
upon reaching the execution sequence number:
verify that the security credentials for the user are correct;
retrieve resource access permissions associated with the user from the storage layer;
generate an access token with a set of claims based on the resource access permissions; and
sign the access token using a share of a private key of the BFT SMR system that is assigned to the replica, the share being known only to the replica and being unknown to the other replicas in the set of N replicas.

16. The computer system of claim 15 wherein the program code is embodied in a blockchain smart contract.

17. The computer system of claim 15 wherein the program code is embodied in an execution engine of the replica.

18. The computer system of claim 15 wherein the BFT SMR system tolerates up to f faulty replicas, and wherein the shares of the private key assigned to the set of N replicas are generated using a (t, N) threshold signature scheme where t=f.

19. The computer system of claim 15 wherein each replica in the set of N replicas is owned by a different organization or a different department within an organization.

20. The computer system of claim 15 wherein the signed access tokens are combined into an aggregate token comprising an aggregate signature that is returned to the user.

21. The computer system of claim 20 wherein after receiving the aggregate token, the user submits a resource access request that includes the aggregate token to an application server, and wherein the application server:
retrieves, from the BFT SMR system, a public key corresponding to the private key;
validates the aggregate signature in the aggregate token using the public key; and
validates that the user is authorized to access a resource identified in the resource access request based on a set of claims in the aggregate token.

* * * * *